US012290177B2

(12) United States Patent
Wang et al.

(10) Patent No.: US 12,290,177 B2
(45) Date of Patent: May 6, 2025

(54) PORTABLE AND ADJUSTABLE BED HAVING MULTIPLE BED SECTIONS WITH INDEPENDENT CONTROL

(71) Applicant: Nisco Co., Ltd, Jiangsu (CN)

(72) Inventors: Wei Wang, Jiangsu (CN); Fahuan Zhang, Jiangsu (CN); Jian Xie, Jiangsu (CN); Yifan Mao, Jiangsu (CN)

(73) Assignee: NISCO CO., LTD, Jiangsu (CN)

( * ) Notice: Subject to any disclaimer, the term of this patent is extended or adjusted under 35 U.S.C. 154(b) by 218 days.

(21) Appl. No.: 18/115,186

(22) Filed: Feb. 28, 2023

(65) Prior Publication Data

US 2023/0200550 A1 Jun. 29, 2023

Related U.S. Application Data

(63) Continuation-in-part of application No. 17/963,256, filed on Oct. 11, 2022, now Pat. No. 12,213,594, which is a continuation-in-part of application No. 16/990,085, filed on Aug. 11, 2020, now Pat. No. 11,602,228, application No. 18/115,186, filed on Feb. 28, 2023 is a continuation-in-part of application No. 16/990,085, filed on Aug. 11, 2020, now Pat. No. 11,602,228.

(60) Provisional application No. 63/254,629, filed on Oct. 12, 2021, provisional application No. 62/889,145, filed on Aug. 20, 2019.

(30) Foreign Application Priority Data

Mar. 4, 2022 (CN) ......................... 202220476995.9

(51) Int. Cl.

| | |
|---|---|
| *A47C 21/00* | (2006.01) |
| *A47C 19/02* | (2006.01) |
| *A47C 20/04* | (2006.01) |
| *A61H 15/00* | (2006.01) |

(52) U.S. Cl.

CPC .......... *A47C 20/041* (2013.01); *A47C 19/021* (2013.01); *A61H 15/0078* (2013.01)

(58) Field of Classification Search

CPC ....... A47C 21/046; A47C 21/00; A47C 27/00; A47C 27/144; A47C 27/148; A47C 31/006; A47C 27/22

See application file for complete search history.

(56) References Cited

U.S. PATENT DOCUMENTS 6,006,379 A * 12/1999 Hensley ................. A47C 20/08 5/915
6,216,289 B1 * 4/2001 Woods ................... A47C 23/00 5/264.1

(Continued)

*Primary Examiner* — Fredrick C Conley

(74) *Attorney, Agent, or Firm* — troutman pepper locke; Tim Tingkang Xia, Esq.

(57) ABSTRACT

An adjustable bed includes a frame structure having a first frame, a second frame, and a pair of connection bars detachably connecting the first frame and the second frame to one another; a plurality of platforms having two or more back platforms disposed on the first frame and two or more lower limb platforms disposed on the second frame; and an adjustable assembly comprising two or more back lifting assemblies coupled with the first frame and two or more leg lifting assemblies coupled with the second frame for individually adjusting each of the two or more back platforms and the two or more lower limb platforms in desired positions.

19 Claims, 12 Drawing Sheets

(56) References Cited

U.S. PATENT DOCUMENTS

| | | | | |
|---|---|---|---|---|
| 9,044,365 | B2 | 6/2015 | Rawls-Meehan | |
| 9,451,833 | B2 | 9/2016 | Rawls-Meehan | |
| 9,629,473 | B2 | 4/2017 | Rawls-Meehan et al. | |
| D793,786 | S | 8/2017 | Rawls-Meehan et al. | |
| 2005/0011005 | A1 * | 1/2005 | Borda | A47C 19/04<br>5/400 |
| 2008/0262657 | A1 * | 10/2008 | Howell | A47C 20/041<br>700/275 |
| 2017/0208956 | A1 * | 7/2017 | Rawls-Meehan | A47C 20/041 |
| 2017/0348186 | A1 * | 12/2017 | Garcia | A61H 23/02 |
| 2018/0110340 | A1 * | 4/2018 | Rawls-Meehan | A47C 20/041 |
| 2019/0137030 | A1 * | 5/2019 | Freelend | A47B 91/024 |

* cited by examiner

170

PORTABLE AND ADJUSTABLE BED HAVING MULTIPLE BED SECTIONS WITH INDEPENDENT CONTROL

CROSS-REFERENCE TO RELATED PATENT APPLICATIONS

This application is a continuation-in-part application of U.S. patent application Ser. No. 17/963,256, filed Oct. 11, 2022, now U.S. Pat. No. 12,213,594, which claims the benefit of U.S. Provisional Patent Application No. 63/254,629, filed Oct. 12, 2021 and Chinese Patent Application No. 202122641948.3, filed Oct. 29, 2021, and is a continuation-in-part application of U.S. patent application Ser. No. 16/990,085, filed Aug. 11, 2020, now U.S. Pat. No. 11,602,228, which itself claims priority to and the benefit of U.S. Provisional Patent Application No. 62/889,145, filed Aug. 20, 2019.

This application is also a continuation-in-part application of U.S. patent application Ser. No. 16/990,085, filed Aug. 11, 2020, now U.S. Pat. No. 11,602,228, which itself claims priority to and the benefit of U.S. Provisional Patent Application No. 62/889,145, filed Aug. 20, 2019.

This application also claims priority to and the benefit of Chinese Patent Application No. 202220476995.9, filed Mar. 4, 2022.

Each of the above-identified applications is incorporated herein in its entirety by reference.

FIELD OF THE INVENTION

The invention generally relates to a bed, and more particular to a portable and adjustable bed having multiple bed sections with each bed section independently controllable.

BACKGROUND OF THE INVENTION

Sleep is critical for people in every aspect of their lives. Beds are necessary furniture for people to sleep on. In a conventional adjustable bed, a frame structure is a rectangle frame having bed side length and width, which may use a great amount of materials for package and occupy a large space during transportation and/or storage. In addition, in a conventional adjustable bed with multiple bed sections, the multiple bed sections cannot be independently adjusted. Thus, it is beneficial and desirable for people to have a portable bed system that is easy for package, transportation, and/or storage. It is also beneficial and desirable that the bed system has multiple bed sections be independently adjusted according to each user's preference. In addition, it is further beneficial and desirable that the bed system has therapeutic functions to promote health and well-being of a user.

SUMMARY OF THE INVENTION

The invention, in one aspect, relates to an adjustable bed having multiple bed sections with each bed section independently controllable. The adjustable bed comprises a frame structure having a first frame, a second frame, and a pair of connection bars detachably connecting the first frame and the second frame to one another; a plurality of platforms having two or more back platforms disposed on the first frame and two or more lower limb platforms disposed on the second frame; and an adjustable assembly comprising two or more back lifting assemblies coupled with the first frame and two or more leg lifting assemblies coupled with the second frame for individually adjusting each of the two or more back platforms and the two or more lower limb platforms in desired positions.

In one embodiment, each of the first and second frames comprises a pair of side rails and at least one middle rail being transversely spaced and longitudinally extended and being parallel to each other, each of the pair of side rails and the at least one middle rail having an upper end portion and an opposite, lower end portion; and an upper rail and a lower rail being longitudinally spaced and transversely extended, two ends of the upper rail being rigidly connected to the upper end portions of the pair of side rails, and two ends of lower rail being rigidly connected to the lower end portions of the pair of side rails, and the upper and lower end portions of the at least one middle rails being rigidly connected to the upper rail and the lower rail, respectively, such that the upper rail, the lower rail, the pair of side rails and the at least one middle rail are in rectangle forms.

In one embodiment, each of the pair of connection bars is connected between the lower end portion of a respective rail of the first frame and the upper end portion of a respective rail of the second frame.

In one embodiment, the connections between the first frame and the pair of connection bars, and the pair of connection bars and the second frame are bolted connections, screw connections, and/or pin connections.

In one embodiment, each of the lower end portions of the pair of side rails of the first frame and the upper end portions of the pair of side rails of the second frame has one or more mounting posts or pins, and wherein two end portions of each of the pair of connection bars has one or more receiving holes in which, as assembled, the one or more mounting posts or pins are received.

In one embodiment, each of the pair of connection bars is made of C-shaped steel or alloy.

In one embodiment, each of the two or more back lifting assemblies comprises a back lifting bracket pivotally connected to the first frame, and a back lifting actuator pivotally connected between the back lifting bracket and the first frame for operably driving the back lifting bracket to pivotally move in an upward rotation direction or a downward rotation direction relative to the first frame.

In one embodiment, each of the two or more leg lifting assemblies comprises a leg lifting bracket pivotally connected to the second frame, and a leg lifting actuator pivotally connected between the leg lifting bracket and the second frame for operably driving the leg lifting bracket to pivotally move in an upward rotation direction or a downward rotation direction relative to the second frame.

In one embodiment, the back lifting bracket comprises a middle bar and a pair of swing arms, wherein the pair of swing arms is transversely spaced and rigidly connected to ends of the transversely extending middle bar, and each of the pair of swing arms has a first end portion and an opposite, second end portion, wherein the first end portions of the pair of swing arms are pivotally mounted to a respective side rail and the at least one middle rail of the first frame.

In one embodiment, the back lifting actuator comprises a motor member, an outer tube extending from the motor member, an activation rod received in the outer tube, engaged with the motor member and configured to be telescopically movable relative to the outer tube according to a direction of motor rotation, wherein the motor member is pivotally connected to the upper rail of the first frame, and the activation rod has a distal end portion pivotally connected to the middle bar of the back lifting bracket, or wherein the motor member is pivotally connected to the middle bar of the back lifting bracket, and the activation rod has a distal end portion pivotally connected to the upper rail of the first frame.

In one embodiment, the swing arms are in an arc-shaped design.

In one embodiment, the second end portion of the swing arms is equipped with a back lifting wheel/roller.

In one embodiment, the leg lifting bracket comprises a middle bar and a pair of swing arms, wherein the pair of swing arms is transversely spaced and rigidly connected to ends of the transversely extending middle bar, and each of the pair of swing arms has a first end portion and an opposite, second end portion, wherein the first end portions of the pair of swing arms are pivotally mounted to a respective side rail and the at least one middle rail of the second frame.

In one embodiment, the leg lifting actuator comprises a motor member, an outer tube extending from the motor member, an activation rod received in the outer tube, engaged with the motor member and configured to be telescopically movable relative to the outer tube according to a direction of motor rotation, wherein the motor member is pivotally connected to the lower rail of the second frame, and the activation rod has a distal end portion pivotally connected to the middle bar of the leg lifting bracket, or wherein the motor member is pivotally connected to the middle bar of the leg lifting bracket, and the activation rod has a distal end portion pivotally connected to the lower rail of the second frame.

In one embodiment, the second end portion of the swing arms is equipped with a leg lifting wheel/roller.

In one embodiment, the two or more back platforms are hinged to the lower rail of the first frame.

In one embodiment, each of the two or more lower limb platforms has a thigh platform having its bottom edge hinged to the upper rail of the second frame; and a leg platform hinged to the top edge of the thigh platform and supported by the pair of foot lifting support bars pivotally connected to the second frame.

In one embodiment, the adjustable bed further comprises a plurality of foot lifting support assemblies and a plurality of leg support bars, each leg support bar being pivotally connected to the second frame through one of the plurality of foot lifting support assemblies, wherein each foot lifting support assembly comprises a sliding bracket, a sliding bracket groove, and a stop pin, wherein the sliding bracket groove is rigidly connected to the second frame, the sliding bracket is received in the sliding bracket groove, each leg support bar has one end pivotally connected to the sliding bracket and another end pivotally connected to one of the two or more lower limb platforms, and the stop pin is coupled to the sliding bracket to operably restrict vertical movements of the sliding bracket.

In one embodiment, the adjustable bed further comprises at least one massage assembly detachably attached onto at least one of the two or more back platforms and the two or more lower limb platforms for providing massage effects.

In one embodiment, at least one massage assembly comprises a massage motor, an elastic belt, a motor cover, a foam house, a velcro loop surface, and a velcro hook surface. The motor cover has an opening, a side of the massage motor passes through the opening of the motor cover, the elastic belt passes through the side of the massage motor, one of the velcro loop surface and the velcro hook surface is fixed onto the motor cover and the other of the velcro loop surface and the velcro hook surface is fixed onto a decking on one of the plurality of platforms, the foam house is placed inside a hole of the decking, the massage motor is placed inside a hole of the foam house so that the velcro loop surface and the velcro hook surface are fit together, and the massage motor is fastened onto the decking.

In one embodiment, the adjustable bed further comprises a plurality of bed post assemblies detachably mounted onto the frame structure.

In one embodiment, each bed post assembly comprises at least a first post member detachably connected to the frame structure and a second post member detachably connected to the first post member. The first post member has a cylindrical body portion with a top end having a top surface and a top recessed surface recessed from the top surface and an opposite bottom end having a bottom surface and a bottom recessed surface recessed from the bottom surface, a connecting post protruded from the top recessed surface and extended beyond the top surface, and a receiving hole defined in the bottom recessed surface. The second post member has a body portion with a top end having a top surface and a top recessed surface recessed from the top surface and an opposite bottom end having a bottom surface, and a connecting post protruded from the top recessed surface and extended beyond the top surface, wherein the top end has a side-to-side width greater than a side-to-side width of the bottom end, and wherein the side-to-side width of the top end of the second post member is substantially equal to a side-to-side width of the bottom end of the first post member. As assembled, the first post member is connected to the frame structure through the connecting post of the first post member, and the connecting post of the second post member is received in the receiving hole of the first post member, such that the top surface of the first post member abuts against a bottom surface of the frame structure, and the top surface of the second post member abuts against the bottom surface of the first post member.

In one embodiment, each bed post assembly comprises two or more post members detachably connected to one another, wherein each post member has a cylindrical body portion having an outer surface defining a top edge and an opposite bottom edge, a top recessed surface recessed from the top edge, and a bottom recessed surface recessed from the bottom edge; a connecting post protruded from the top recessed surface and extended beyond the top edge of the cylindrical body portion; and a receiving hole defined in the bottom recessed surface of the cylindrical body portion. As assembled, the two or more post members are connected to one another by placing the connecting post of one of the two or more post members into the receiving hole of another of the two or more post members, and the post assembly is connected to the frame structure through the connecting post of a top post member of the two or more members.

These and other aspects of the invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment.

FIG. 4A: a perspective view (left), and a transparently perspective view (right) showing internal structure. FIG. 4B: another perspective view (left), and another transparently perspective view (right) showing internal structure. FIG. 4C: a perspective view (left), and a transparently perspective view (right) showing internal structure.

FIG. 5A: an exploded view. FIG. 5B: an exploded, cross-sectional view. FIG. 5C: a cross-sectional view.

FIG. 6A: an exploded view. FIG. 6B: another exploded view. FIG. 6C: a perspective view. FIG. 6D: an exploded, cross-sectional view. FIG. 6E: a cross-sectional view.

FIG. 10A: in one state of the foot lifting support assembly. FIG. 10B: in a stop state of the foot lifting support assembly.

FIG. 11A: an exploded view. FIG. 11B: a perspective view.

DETAILED DESCRIPTION OF THE INVENTION

Figure 1:
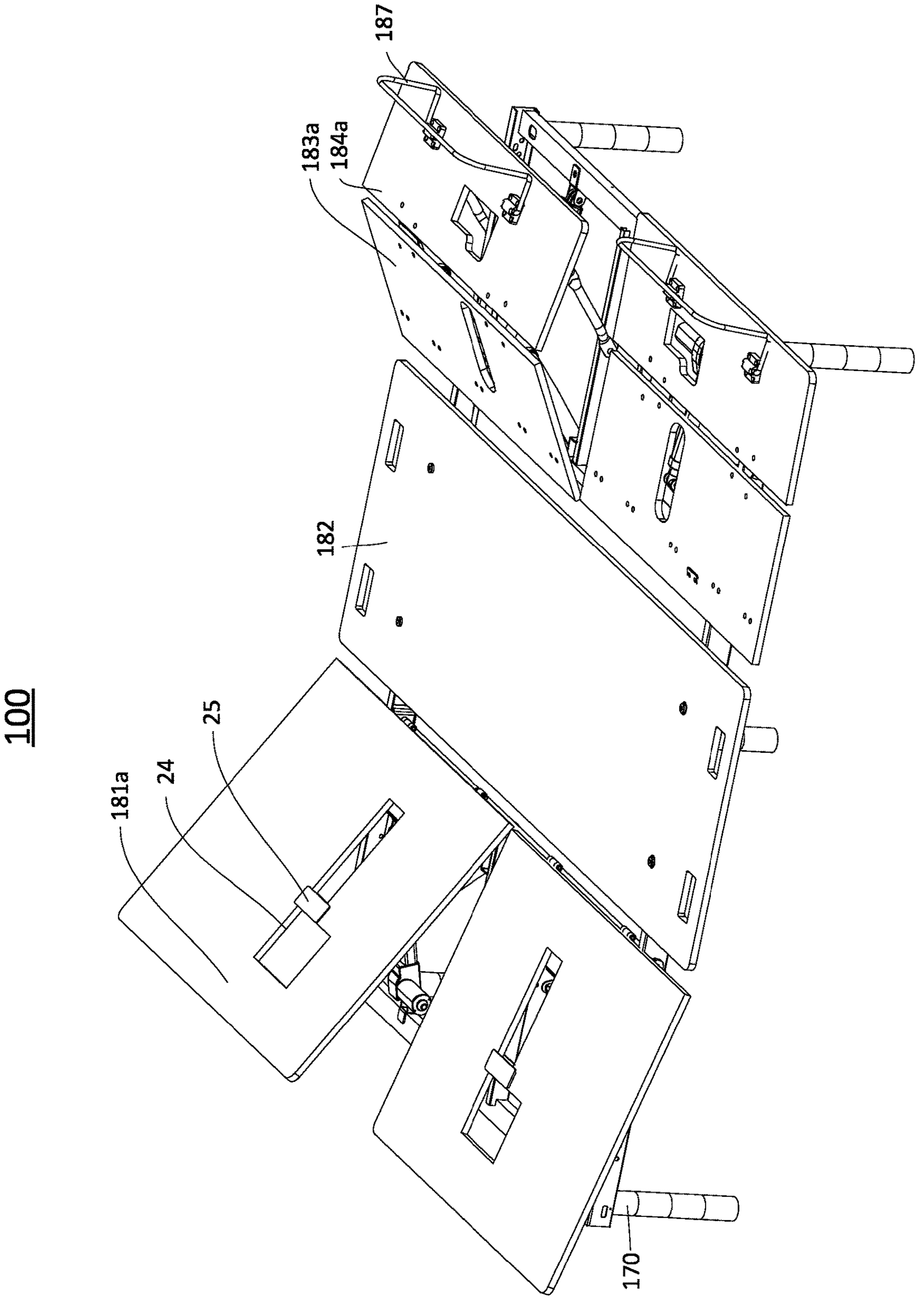
FIG. 1 shows schematically a perspective view of an adjustable bed according to one embodiment of the invention, where one bed is in a full adjusted state, while the other bed is in a partially adjusted state.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being “on” another element, it can be directly on the other element or intervening elements may be present therebetween. In contrast, when an element is referred to as being “directly on” another element, there are no intervening elements present. As used herein, the term “and/or” includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprises” and/or “comprising,” or “includes” and/or “including” when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as “lower” or “bottom” and “upper” or “top,” may be used herein to describe one element’s relationship to another element as illustrated in the Figures. It will be understood that relative terms are intended to encompass different orientations of the device in addition to the orientation depicted in the Figures. For example, if the device in one of the figures is turned over, elements described as being on the “lower” side of other elements would then be oriented on “upper” sides of the other elements. The exemplary term “lower”, can therefore, encompasses both an orientation of “lower” and “upper,” depending of the particular orientation of the figure. Similarly, if the device in one of the figures is turned over, elements described as “below” or “beneath” other elements would then be oriented “above” the other elements. The exemplary terms “below” or “beneath” can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about" "substantially" or "approximately" can be inferred if not expressly stated.

The term "app", used herein the specification, refers to an application, especially as downloaded by a user to and installed in a mobile device, which a software program that is designed to perform specific functions directly for the user or, in some cases, for another application program or for operations of devices, such as back lifting actuators (motor), leg lifting actuators (motors), and/or a massage assembly in the invention.

The term "platform" used herein refers to a board, bed board, panel, deck panel, or deck board.

As used in this specification, the phrase "at least one of A, B, and C" should be construed to mean a logical (A or B or C), using a non-exclusive logical OR. As used herein, the term "and/or" includes any and all combinations of one or more of the associated listed items.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. In accordance with the purposes of this invention, as embodied and broadly described herein, this invention, in one aspect, relates to a portable and adjustable bed with an aromatherapy system.

Exemplary embodiments of the invention will be described in conjunction with the accompanying drawings in FIGS. 1-12. For purposes of clarity, the same reference numbers will be used in the drawings to identify similar elements.

Figure 2:
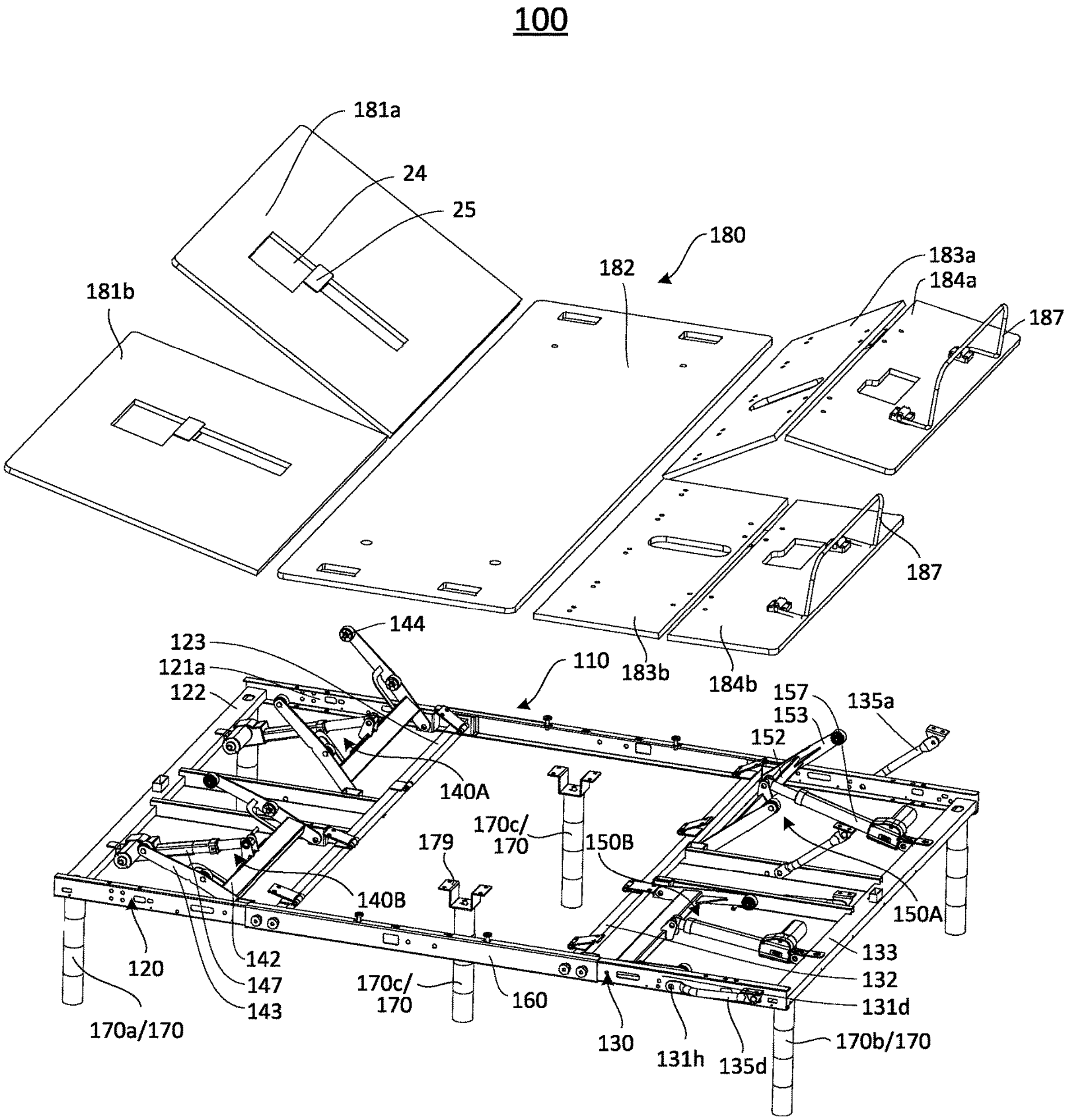
FIG. 2 shows schematically and partially an exploded view of the adjustable bed shown in FIG. 1.
Figure 3:
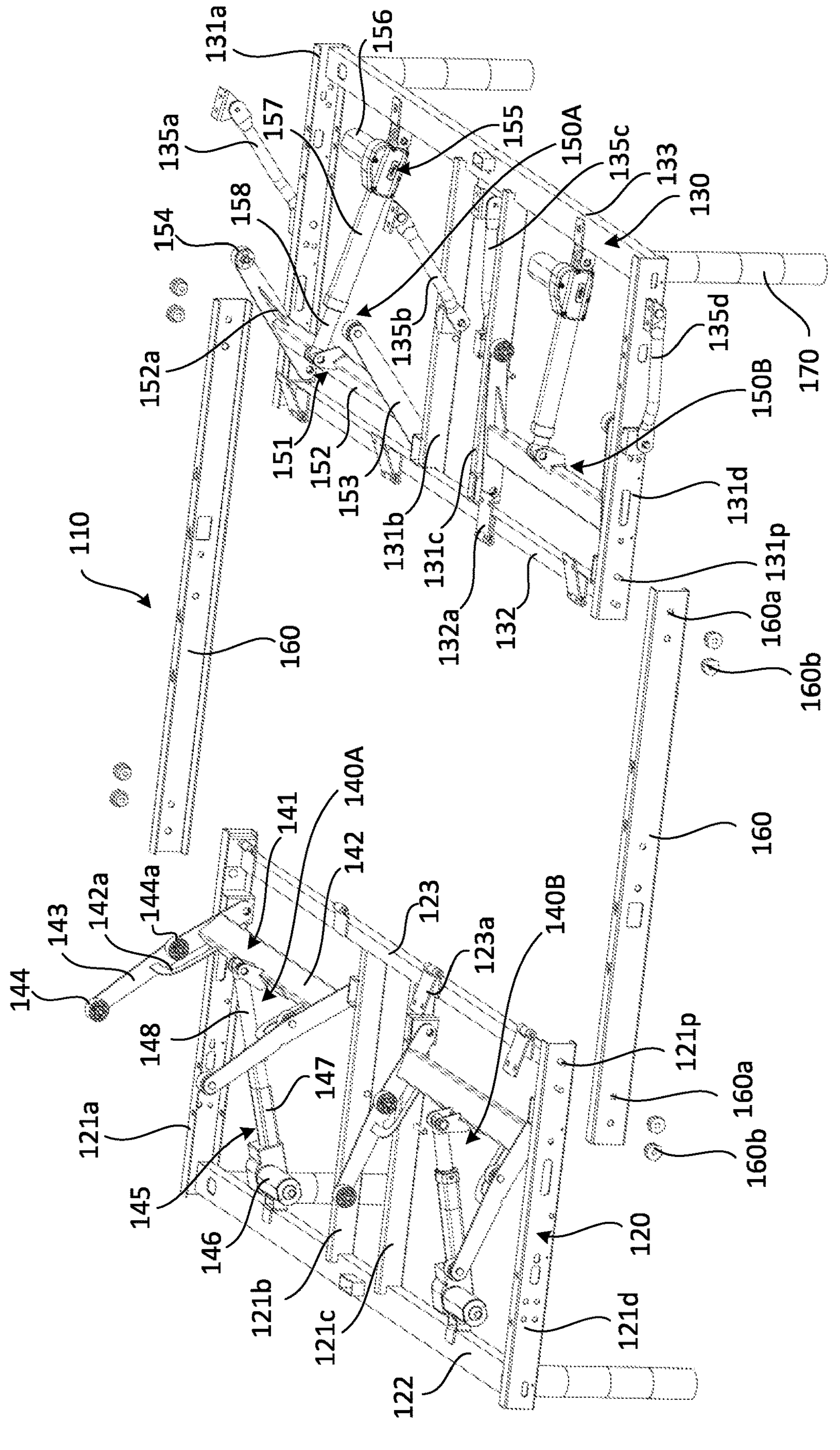
FIG. 3 shows schematically and partially an exploded view of the frame structure and the adjustable assembly of the adjustable bed shown in FIG. 1.
Figure 4A:
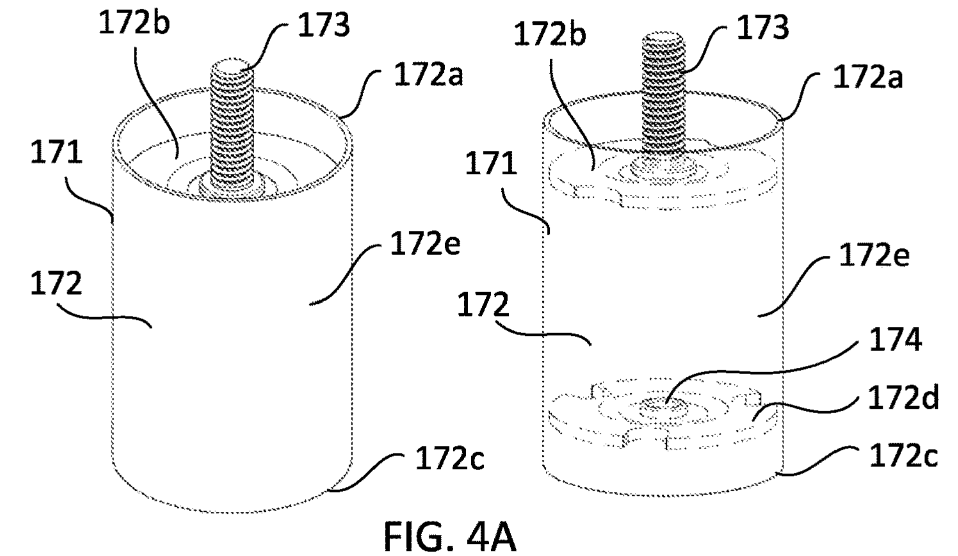
FIGS. 4A-4C show schematically various views of a bed post member according to one embodiment of the invention.
Figure 4B:
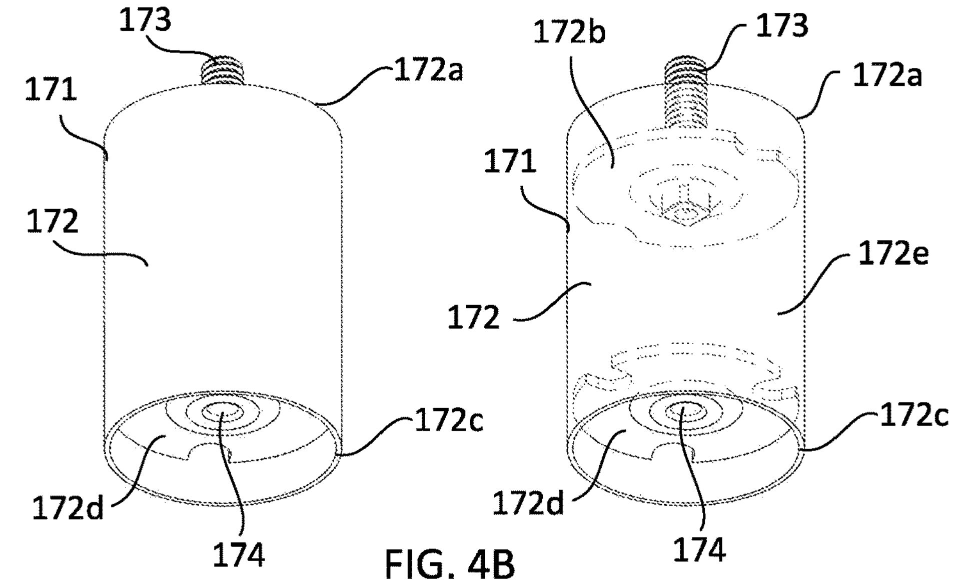
Figure 4C:
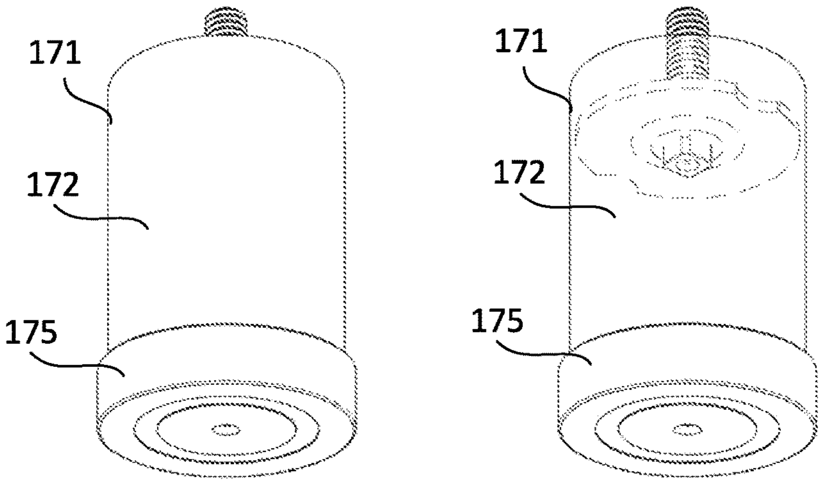
Figure 5A:
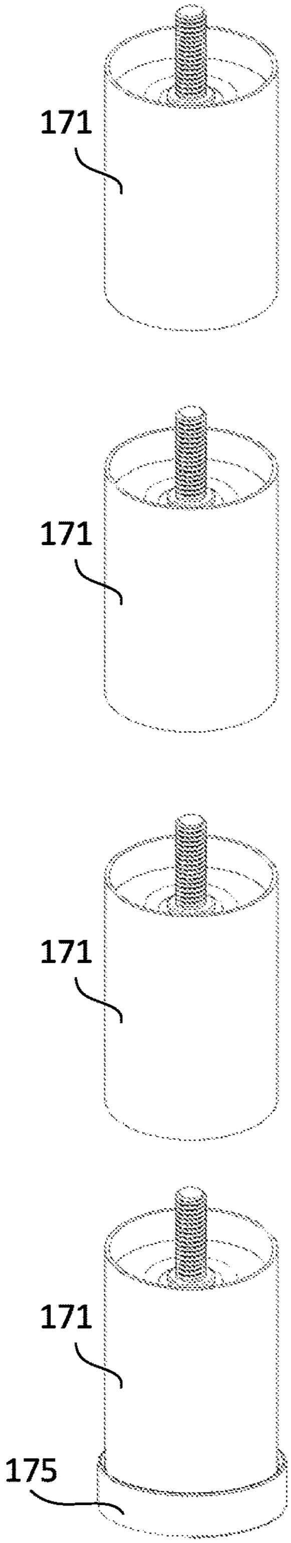
FIGS. 5A-5C show schematically various views of a bed post assembly including a plurality of bed post members shown in FIGS. 4A-4C according to one embodiment of the invention.
Figure 5B:
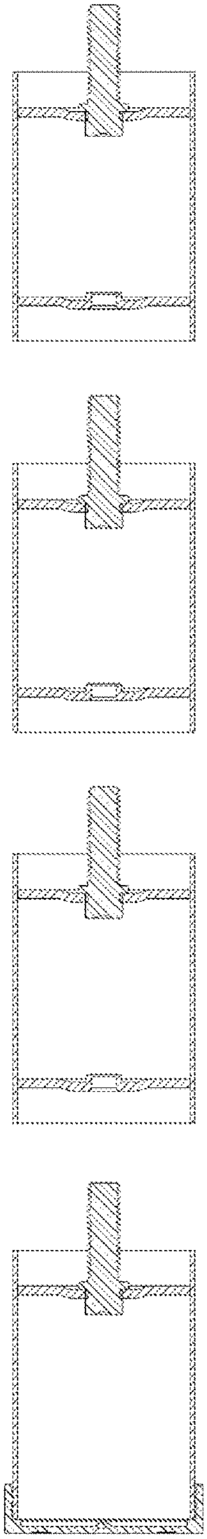
Figure 5C:
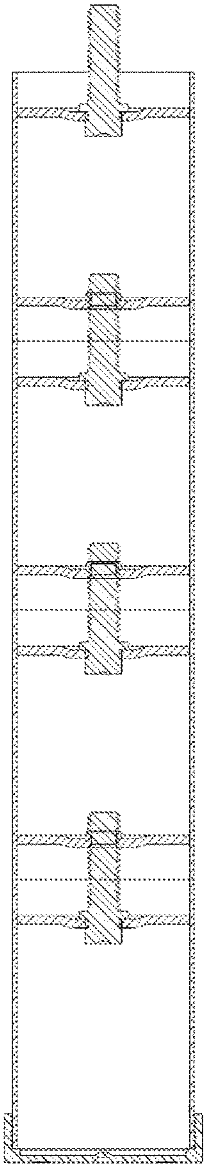
Figures 6A, 6B, 6C, 6D, 6E:
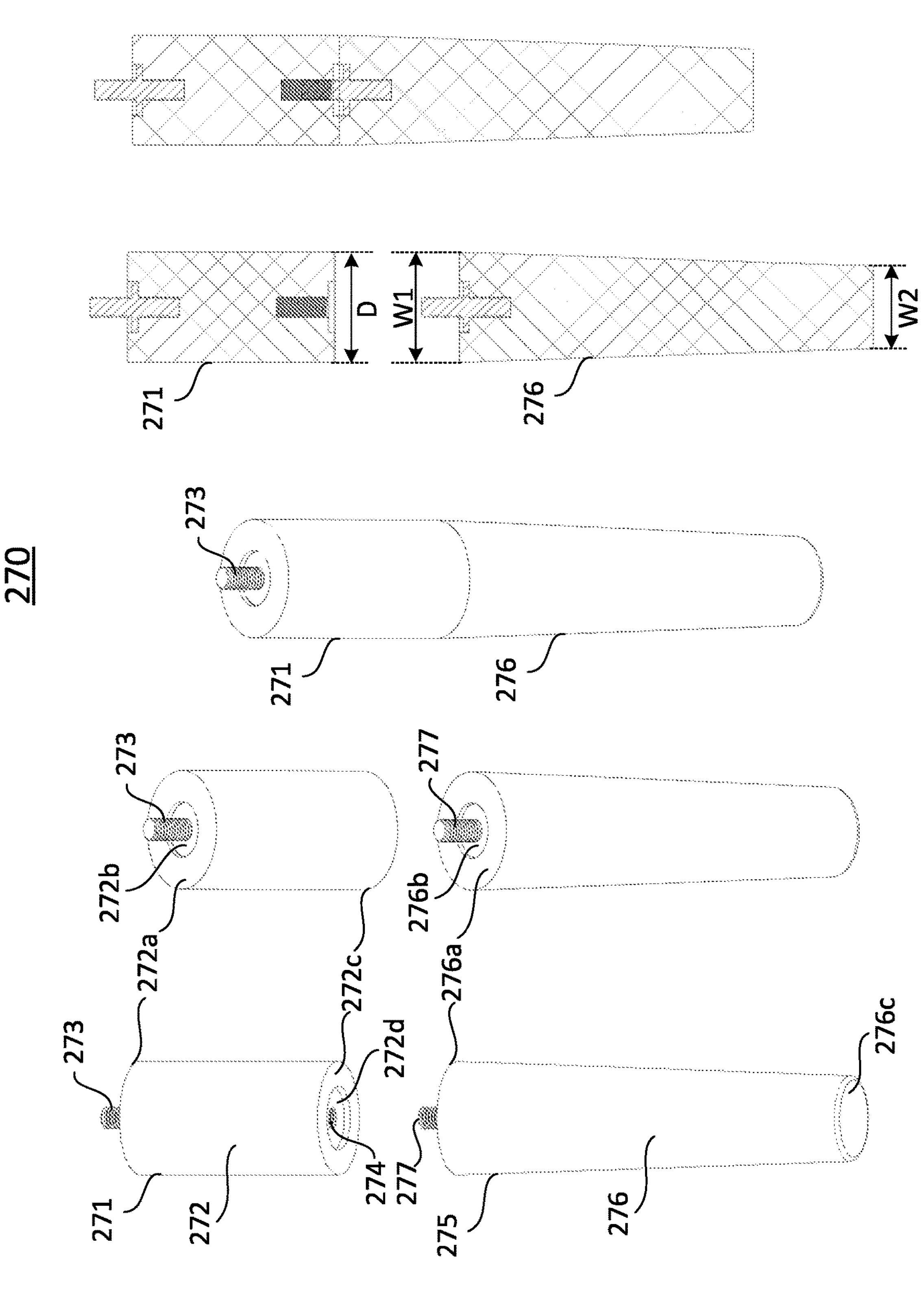
FIGS. 6A-6E show schematically various views of a bed post assembly according to another embodiment of the invention.

Referring to FIGS. 1-3, the portable and adjustable bed 100 includes a frame structure 110; a plurality of platforms 180 disposed on the frame structure 110; and an adjustable assembly coupled with the frame structure 110 for operably adjusting one or more of the plurality of platforms 180 in desired positions. The portable and adjustable bed 100 has two bed sections with each bed section independently controllable. It should be noted that a bed system with more than two bed sections can also be utilized to practice the invention.

Specifically, the frame structure 110 comprises a first frame 120, a second frame 130, and a pair of connection bars 160 detachably connecting the first frame 120 and the second frame 130 to one another.

The first frame 120 includes a pair of side rails 121*a* and 121*d* and two middle rails 121*b* and 121*c* being transversely spaced and longitudinally extended and being parallel to each other, an upper rail 122 and a lower rail 123 being longitudinally spaced and transversely extended. Each of the pair of side rails 121*a* and 121*d* and the two middle rails 121*b* and 121*c* has an upper end portion and an opposite, lower end portion. Two ends of the upper rail 122 is rigidly connected to the upper end portions of the pair of side rails 121*a* and 121*b*, respectively. Two ends of the lower rail 123 is rigidly connected to the lower end portions of the pair of side rails 1211 and 121*d*, respectively. The upper and lower end portions of the two middle rails 121*b* and 121*c* are rigidly connected to the upper rail 122 and the lower rail 123, respectively. As such, the pair of side rails 121*a* and 121*d*, the upper rail 122 and the lower rail 123 are in a rectangle form, while the side rail 121*a*, the middle rails 121*b*, the upper rail 122 and the lower rail 123 are also in a rectangle form, and the side rail 121*d*, the middle rails 121*c*, the upper rail 122 and the lower rail 123 are in a rectangle form as well. In some embodiments, the top surfaces of the pair of side rails 121*a* and 121*d* and the two middle rails 121*b* and 121*c* are substantially coplanar, i.e., lying substantially in the same plane. Preferably, the connections of the pair of side rails 121 and the two middle rails 121*b* and 121*c* to the upper and lower rails 122 and 123 are by welding the ends of the upper rail 122 onto end portions of the pair of side rails 121, and welding the ends of the lower rail 123 onto opposite end portions of the pair of side rails 121, and welding the upper and lower ends of the two middle rails 121*b* and 121*c* onto the upper rail 122 and the lower rail 123. Other connecting means can also be utilized to practice the invention.

The second frame 130 includes a pair of side rails 131*a* and 131*d* and two middle rails 131*b* and 131*c* being transversely spaced and longitudinally extended and being parallel to each other, an upper rail 132 and a lower rail 133 being longitudinally spaced and transversely extended. Each of the pair of side rails 131*a* and 131*d* and the two middle rails 131*b* and 131*c* has an upper end portion and an opposite, lower end portion. Two ends of the upper rail 132 is rigidly connected to the upper end portions of the pair of side rails 131*a* and 131*b*, respectively. Two ends of the lower rail 133 is rigidly connected to the lower end portions of the pair of side rails 1311 and 131*d*, respectively. The upper and lower end portions of the two middle rails 131*b* and 131*c* are rigidly connected to the upper rail 132 and the lower rail 133, respectively. As such, the pair of side rails 131*a* and 131*d*, the upper rail 132 and the lower rail 133 are in a rectangle form, while the side rail 131*a*, the middle rails 131*b*, the upper rail 132 and the lower rail 133 are also in a rectangle form, and the side rail 131*d*, the middle rails 131*c*, the upper rail 132 and the lower rail 133 are in a rectangle form as well. In some embodiments, the top surfaces of the pair of side rails 131*a* and 131*d* and the two middle rails 131*b* and 131*c* are substantially coplanar, i.e., lying substantially in the same plane. Preferably, the connections of the pair of side rails 131 and the two middle rails 131*b* and 131*c* to the upper and lower rails 132 and 133 are by welding the ends of the upper rail 132 onto end portions of the pair of side rails 131, and welding the ends of the lower rail 133 onto opposite end portions of the pair of side rails 131, and welding the upper and lower ends of the two middle rails 131*b* and 131*c* onto the upper rail 132 and the lower rail 133. Other connecting means can also be utilized to practice the invention.

Each of the pair of connection bars 160 is connected between the lower end portion of a respective rail 121*a*/121*d* of the first frame 120 and the upper end portion of a respective rail 131*a*/131*d* of the second frame 130.

In some embodiments, the connections between the first frame 120 and the pair of connection bars 160, and the connections between the pair of connection bars 160 and the second frame 130 are bolted connections, screw connections, and/or pin connections, so that the connections can be detached for transportation and/or storage, for example.

In some embodiments, each of the lower end portions of the pair of side rails 121*a* and 121*d* of the first frame 120 and the upper end portions of the pair of side rails 131*a* and 131*d* of the second frame 130 has one or more mounting posts or pins or bolts 121*p* and 131*p*, as shown in FIG. 3. Two end portions of each of the pair of connection bars 160 has one or more receiving holes 160*a*. As assembled, the one or more receiving holes 160*a* receive and accommodate the corresponding one or more mounting posts or pins or bolts 121*p*/131*p* in the lower end portions of the pair of side rails 121*a* and 121*d* of the first frame 120 and the upper end portions of the pair of side rails 131*a* and 131*d* of the second frame 130, and secured by, for example, nuts 160*b*. Alternatively, each of the lower end portions of the pair of side rails 121*a* and 121*d* of the first frame 120 and the upper end portions of the pair of side rails 131*a* and 131*d* of the second frame 130 has one or more mounting receiving holes, and two end portions of each of the pair of connection bars 160 has one or more mounting posts or pins (not shown). As assembled, the one or more receiving holes in the lower end portions of the pair of side rails 121*a* and 121*d* of the first frame 120 and the upper end portions of the pair of side rails 131*a* and 131*d* of the second frame 130 receive and accommodate the corresponding one or more mounting posts or pins of the pair of connection bars 160.

In some embodiments, each of the pair of connection bars is made of C-shaped steel or alloy.

In some embodiments, each of the pair of connection bars 160 has a length that can be manufactured in various lengths, so as to adjust the length of the bed 100, according to the user's preference.

By the design of two frame structures 120 and 130 with connection bars 160, the first frame 120 and the second frame 130 can be easily connected to one another by the connection bars 160 during the bed installation, or disconnected from one another for bed package, transportation, and/or storage. The latter makes the package of the bed lighter and smaller than usual beds, and carrying or moving of the bed easier, which makes the bed more portable. In addition, by selecting the length of the connection bars 160, the length of the bed can be changed accordingly.

The plurality of platforms 180 comprises two back platforms 181*a* and 181*b* having their bottom edges hinged to the lower rail 123 of the first frame 120, via hinges 123*a*; one or more seat platforms 182 mounted on the pair of connection bars 160; and two lower limb platforms. The two lower limb platforms include two thigh platforms 183*a* and 183*b* having their bottom edges hinged to the upper rail 132 of the second frame 130, via hinges 132*a*; and two leg platforms 184*a* and 184*b* hinged to another edges of the two thigh platforms 183*a* and 183*b*. Each leg platform 184*a*/184*b* is supported by a pair of leg support bars 135*a*/135*c* and 135*b*/135*d* that are pivotally connected to the pair of side rails 131*a* and 131*d* and two middle rails 131*b* and 131*c* of the second frame 130 by posts or pins 131*h*, as shown in FIG. 2.

In addition, the back platforms 181*a* and 182, the thigh platforms 183*a* and 183*b*, and the leg platforms 184*a* and 184*b* may have openings 24 for avoiding the back and leg lifting actuators 145 and 155 from being in contact with these platforms during the movements of the back and leg lifting actuators 145 and 155, as shown in FIGS. 1-2. In addition, a splint 25 may be fixed on the opening 24.

Further, as shown in FIGS. 1-2, the leg platform 184*a*/184*b* is equipped with a mattress retainer 187 for retaining the mattress on the plurality of platforms.

The adjustable assembly includes two back lifting assemblies 140A and 140B. The back lifting assembly 140A is coupled to the rectangle form of the side rail 121*a*, the middle rails 121*b*, the upper rail 122 and the lower rail 123 of the first frame 120 for adjusting the back platform 181*a* in a desired position, while the back lifting assembly 140A is coupled to the rectangle form of the side rail 121*d*, the middle rails 121*c*, the upper rail 122 and the lower rail 123 of the first frame 120 for adjusting the back platform 181*b* in a desired position.

The adjustable assembly also includes two leg lifting assemblies 150A and 150B The leg lifting assembly 150A is coupled to the rectangle form of the side rail 131*a*, the middle rails 131*b*, the upper rail 132 and the lower rail 133 of the second frame 130 for adjusting the leg platform 184*a* in a desired position, while the leg lifting assembly 150A is coupled to the rectangle form of the side rail 131*d*, the middle rails 131*c*, the upper rail 132 and the lower rail 133 of the second frame 130 for adjusting the leg platform 184*b* in a desired position.

In some embodiments, the two back lifting assemblies 140A and 140B are structurally and functionally same, and the two leg lifting assemblies 150A and 150B are also structurally and functionally same. For the purpose of concise descriptions, only the details of the back lifting assembly 140A and the leg lifting assembly 150A are described below.

As shown in FIGS. 2-3, the back lifting assembly 140A includes a back lifting bracket 141 pivotally connected to the rectangle form of the side rail 121*a*, the middle rails 121*b*, the upper rail 122 and the lower rail 123 of the first frame 120 and slidably coupled to the back platform 181*a*, and a back lifting actuator 145 pivotally connected between the back lifting bracket 141 and the rectangle form of the side rail 121*a*, the middle rails 121*b*, the upper rail 122 and the lower rail 123 of the first frame 120 for operably driving the back lifting bracket 141 to pivotally move in an upward rotation direction or a downward rotation direction relative to the first frame 120.

In some embodiments, the back lifting bracket 141 comprises a middle bar 142 and a pair of swing arms 143. The pair of swing arms 143 is transversely spaced and rigidly connected to ends of the transversely extending middle bar 142 in an H-shaped form. Each of the pair of swing arms 143 has a first end portion and an opposite, second end portion. The first end portions of the pair of swing arms 143 are pivotally mounted to the side rail 121*a* and the middle rail 121*b*, respectively, of the first frame 120. Each of the second end portions of the pair of swing arms 143 is equipped with a back lifting wheel/roller 144, which is operably slidable along the rear surface of the back platform 181*a*. In some embodiments, each swing arms 143 may also be equipped with an additional lifting wheel 144*a* in a position between the second end portion and a connection point of the middle bar 142 to the swing arms 143. The additional lifting wheel 144*a* is also operably slidable along the rear surface of the back platform 181*a*. In addition, each of the pair of swing arms 143 may be reinforced by a reinforcing piece 142*a* rigidly connected to the middle bar 143 and the swing arm 143, as shown FIG. 3.

In some embodiments, the swing arms 143 are in an arc-shaped design.

The back lifting actuator 145 comprises a motor member 146, an outer tube 147 extending from the motor member 146, an activation rod 148 received in the outer tube 147, engaged with the motor member 146 and configured to be telescopically movable relative to the outer tube 147 according to a direction of motor rotation. In one embodiment, the motor member 146 is pivotally connected to the upper rail 122 of the first frame 120, and the activation rod 148 has a distal end portion pivotally connected to the middle bar 142 of the back lifting bracket 141. In another embodiment, the motor member 146 is pivotally connected to the middle bar 142 of the back lifting bracket 140, and the activation rod 148 has a distal end portion pivotally connected to the upper rail 122 of the first frame 120.

In operation, when the motor member 146 drives the activation rod 148 to expand, the expansion of the activation rod 148 pushes the back lifting bracket 141 to rotate in an upward rotation direction. As a result, the back lifting wheel/roller 144 on the free end of each swing arm 143 is sliding along the rear surface of the back platform 181*a* and therefore pushes the back platform 181*a* to rotate around the hinges 123*a*, i.e., around the bottom edge, in the upward rotation direction accordingly, so as to lift the back platform 181*a* in a desired position/angle, where the bed is in the adjusting/lifting state, as shown in FIGS. 1-2. Otherwise, when the motor member 146 drives the activation rod 148 to retract, the retraction of the activation rod 148 results in the back lifting bracket 141 to rotate in a downward rotation direction due to the gravity. As a result, the back lifting wheel/roller 144 on the free end of each swing arm 143 is sliding along the rear surface of the back platform 181*a* and the back support bar 121 rotates in the downward direction accordingly, which lowers the back platform 181*a* in a desired position/angle, or in a flat state.

The leg lifting assembly 150 comprises a leg lifting bracket 151 pivotally connected to the rectangle form of the side rail 131*a*, the middle rails 131*b*, the upper rail 132 and the lower rail 133 of the second frame 130 and slidably coupled to the thigh platform 183*a*, and a leg lifting actuator 155 pivotally connected between the leg lifting bracket 151 and the rectangle form of the side rail 131*a*, the middle rails 131*b*, the upper rail 132 and the lower rail 133 of the second frame 130 for operably driving the leg lifting bracket 151 to pivotally move in an upward rotation direction or a downward rotation direction relative to the second frame 130.

The leg lifting bracket 151 comprises a middle bar 152 and a pair of swing arms 153. The pair of swing arms 153 is transversely spaced and rigidly connected to ends of the transversely extending middle bar 152 in an H-shaped form. Each of the pair of swing arms 153 has a first end portion and an opposite, second end portion. The first end portions of the pair of swing arms 153 are pivotally mounted to the side rail 131*a* and the middle rail 131*b* of the second frame 130. Each of the second end portions of the pair of swing arms 153 is equipped with a leg lifting wheel/roller 154, which is operably slidable along the rear surface of the thigh platform 183*a*. In addition, each of the pair of swing arms 153 may be reinforced by a reinforcing piece 152*a* rigidly connected to the middle bar 152 and the swing arm 153, as shown in FIG. 3.

The leg lifting actuator 155 comprises a motor member 156, an outer tube 157 extending from the motor member 156, an activation rod 158 received in the outer tube 157, engaged with the motor member 156 and configured to be telescopically movable relative to the outer tube 157 according to a direction of motor rotation. In one embodiment, the motor member 157 is pivotally connected to the lower rail 133 of the second frame 130, and the activation rod 158 has a distal end portion pivotally connected to the middle bar 152 of the leg lifting bracket 151 mounted of the middle bar 152. In another embodiment, the motor member 146 is pivotally connected to the middle bar 152 of the leg lifting bracket 151, and the activation rod 158 has a distal end portion pivotally connected to the lower rail 133 of the second frame 130.

In operation, when the motor member 156 drives the activation rod 158 to expand, the expansion of the activation rod 158 pushes the leg lifting bracket 151 to rotate in an upward rotation direction. As a result, the leg lifting wheel/roller 154 on the free end of each swing arm 153 is sliding along the rear surface of the thigh platform 183*a* and therefore pushes the thigh platform 183*a* to rotate around the hinges 132*a*, i.e., around the lower edge of the thigh platform 183*a*, in the upward rotation direction accordingly, and the rotation of the thigh platform 183*a* in the upward rotation direction in turn pulls the leg platform 184*a* and the leg support bars 135*a* and 135*b* to move accordingly, which lifts the thigh platform 183*a* and leg platform 184*a* in a desired position/angle, where the bed is in the adjusting/lifting state, as shown in FIGS. 1-2. Otherwise, when the motor member 156 drives the activation rod 158 to retract, the retraction of the activation rod 158 results in the leg lifting bracket 151 to rotate in a downward rotation direction due to the gravity. As a result, the leg lifting wheel/roller 154 on the free end of each swing arm 153 is sliding along the rear surface of the thigh platform 183*a* and the thigh platform 183*a* rotates in the downward rotation direction accordingly, and the rotation of the thigh platform 183*a* in the downward rotation direction in turn pushes the leg platform 184*a* and the leg support bars 135*a* and 135*b* to move accordingly, which lowers the thigh platform 183*a* and the leg platform 184*a* in a desired position/angle, or in a flat state.

In addition, the portable and adjustable bed 100 also has a plurality of bed post assemblies 170 detachably mounted on the frame structure for providing support to the bed. As shown in FIGS. 1-3, six (6) bed post assemblies 170 are adapted for the support. Of them, two bed post assemblies 170*a* are mounted on the underneath of the two end portions of the upper rail 122 of the first frame 120, two bed post assemblies 170*b* are mounted on the underneath of the two end portions of the lower rail 133 of the second frame 130, and two bed post assemblies 170*c* are mounted on the underneath of the seat platform 182 by mounting brackets 179.

In one embodiment, each bed post assembly 170 is a modular post assembly that may comprise two or more post members 171 as shown in FIGS. 4A-4C and 5A-5C.

Each post member 171 includes a cylindrical body portion 172 having an outer surface 172*e* defining a top edge 172*a* and an opposite bottom edge 172*c*, a top recessed surface 172*b* recessed from the top edge 172*a*, and a bottom recessed surface 172*d* recessed from the bottom edge 172*c*; a connecting post 173 protruded from the top recessed surface 172*b* and extended beyond the top edge 172*a* of the cylindrical body portion 172; and a receiving hole 174 defined in the bottom recessed surface 172*d* of the cylindrical body portion 172.

As assembled, the two or more post members 171 are detachably connected to one another by placing the connecting post 173 of one of the two or more post members 171 into the receiving hole 174 of another of the two or more post members 171. The post assembly 170 is detachably connected to the underneath of the frame structure through the connecting post 173 of the top post member of the two or more members 171.

In addition, the post assembly 170 mat have a cover 175 attached to the bottom edge 172*c* of the bottom post member of the two or more members 171.

In the exemplary embodiment shown in FIGS. 1-3, each post assembly 170 has four post members 171. It should be noted that other numbers of the post members 171 can also be used to practice the invention. The number of the post members 171 adapted depends from the desired bed height that a user may prefer. If the user prefers a higher bed setting, more numbers of the post members 171 can be used. Otherwise, less numbers of the post members 171 can be used.

Referring to FIGS. 6A-6E, another embodiment of the bed post assembly is shown. In the exemplary embodiment, the bed post assembly 270 is also a modular post assembly that includes a first post member 271 and a second post member 276 detachably connected to the first post member 271, which is, in turn, detachably connected to the frame structure 110.

The first post member 271 has a cylindrical body portion 272 with a top end having a top surface 272*a* and a top recessed surface 272*b* recessed from the top surface 272*a* and an opposite bottom end having a bottom surface 272*c* and a bottom recessed surface 272*d* recessed from the bottom surface 272*c*, a connecting post 273 protruded from the top recessed surface 272*b* and extended beyond the top surface 272*a*, and a receiving hole 274 defined in the bottom recessed surface 272*d.*

The second post member 275 has a body portion 276 with a top end having a top surface 276*a* and a top recessed surface 186*b* recessed from the top surface 276*a* and an opposite bottom end having a bottom surface 276*c*, and a connecting post 277 protruded from the top recessed surface 276*b* and extended beyond the top surface 276*a*, wherein the top end has a side-to-side width W1 greater than a side-to-side width W2 of the bottom end.

In one embodiment, the side-to-side width W1 of the top end of the second post member 275 is substantially equal to a side-to-side width D of the bottom end of the first post member 272.

As assembled, the first post member 271 is connected to the frame structure 110 through the connecting post 273 of the first post member 271, and the connecting post 277 of the second post member 275 is received in the receiving hole 274 of the first post member 271, such that the top surface 272*a* of the first post member 271 abuts against a bottom surface of the frame structure 110, and the top surface 276*a* of the second post member 276 abuts against the bottom surface 272*c* of the first post member 271.

In other embodiments, the modular post assembly 270 may include two or more first post members 271 and a second post member 275. The number of the first post members 271 adapted depends from the desired bed height that a user may prefer. If the user prefers a higher bed setting, more numbers of the first post members 271 can be used. Otherwise, less numbers of the first post members 271 can be used. The two or more first post members 271 are detachably connected to one another by placing the connecting post 273 of one first post member 271 to the receiving hole 274 of another first post member 271. The second post member 275 is detachably connected to the bottom one of the two or more first post members 271. The connecting post 273 of the top one of the of the two or more first post members 271 is detachably connected to the underneath of frame structure 110.

Figure 7:
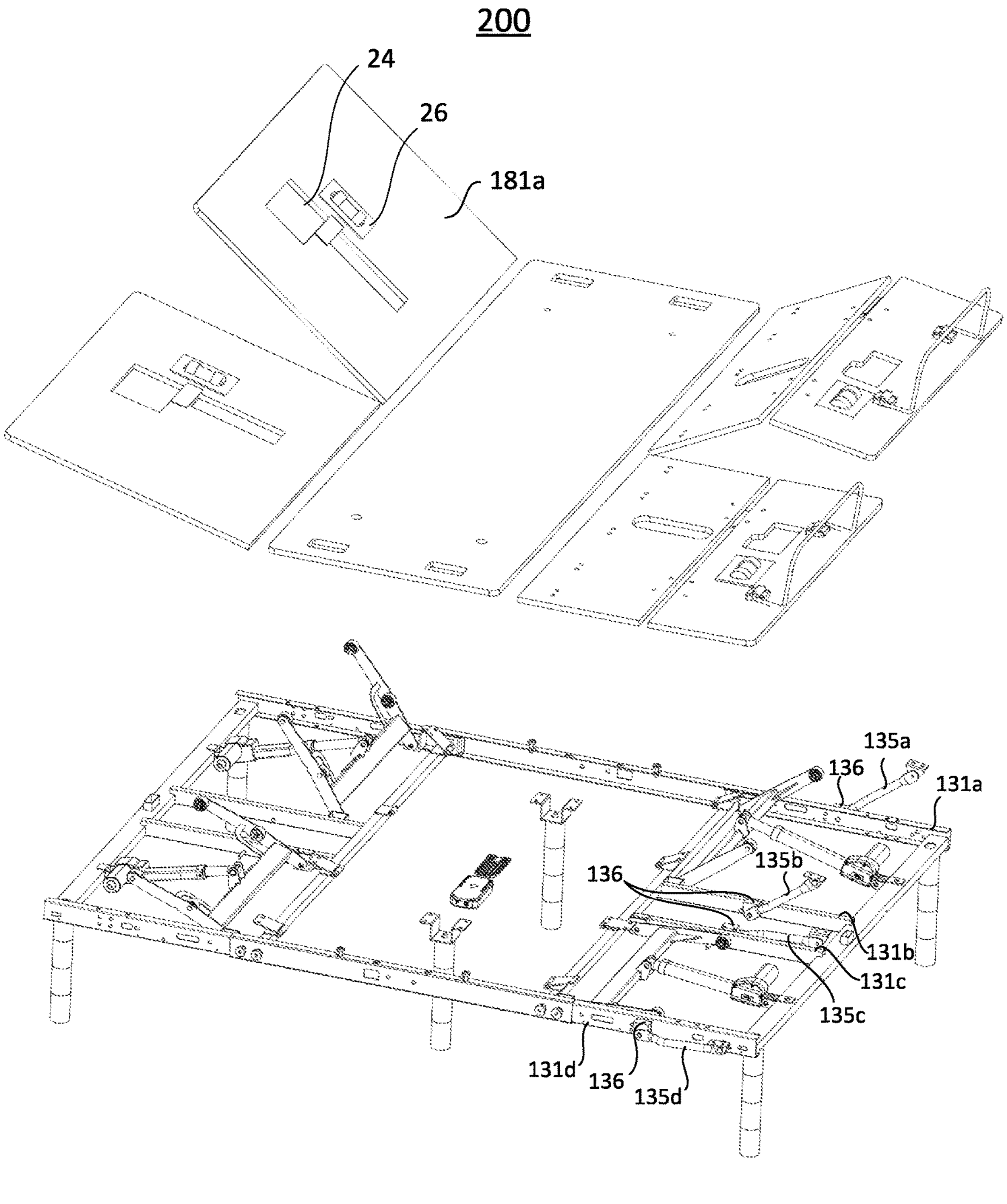
FIG. 7 shows schematically a partially exploded view of an adjustable bed according to another embodiment of the invention, where one bed is in a full adjusted state, while the other bed is in a partially adjusted state.
Figure 8:
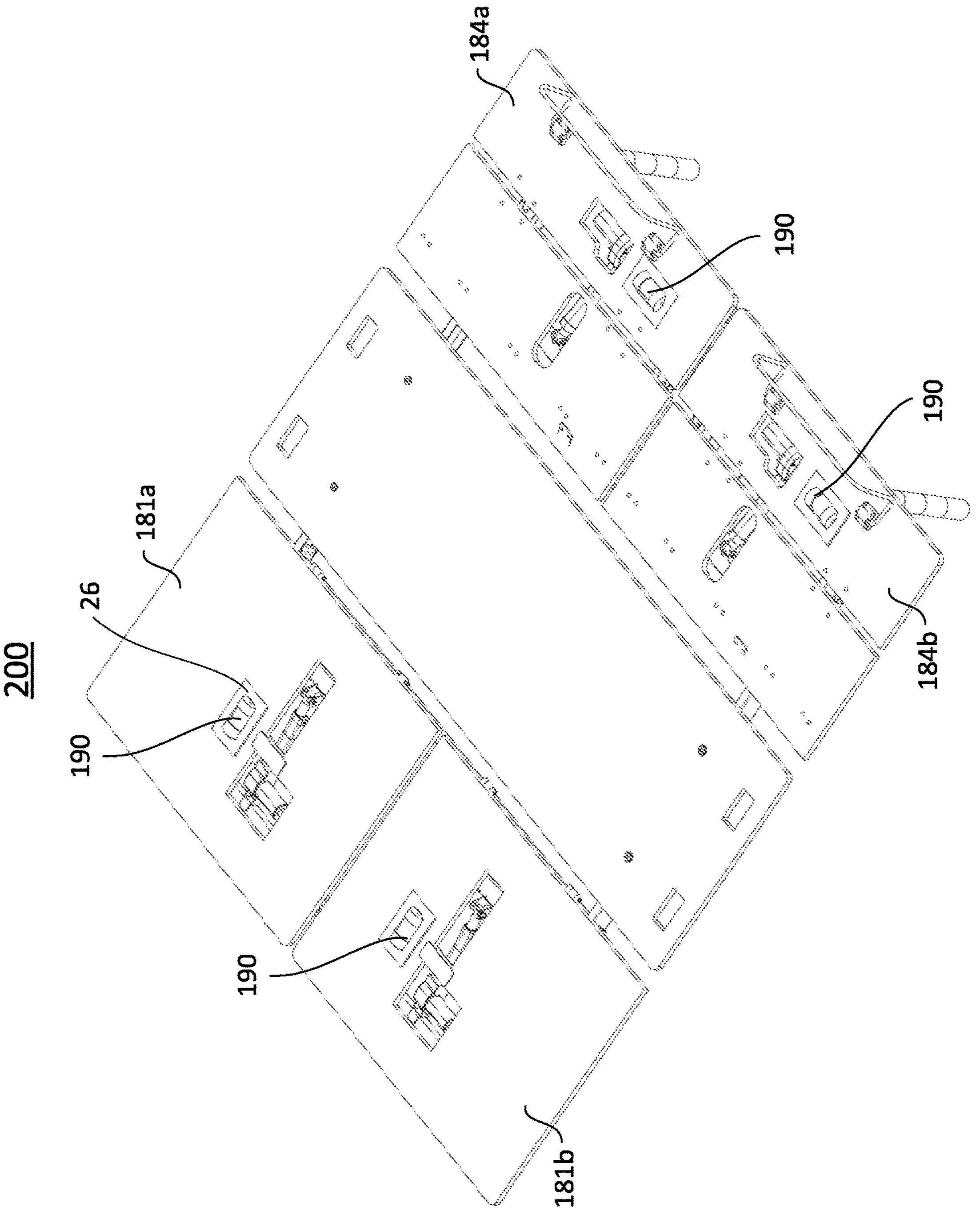
FIG. 8 shows schematically a front perspective view of the adjustable bed shown in FIG. 7, where both two beds are in a flat state.
Figure 9:
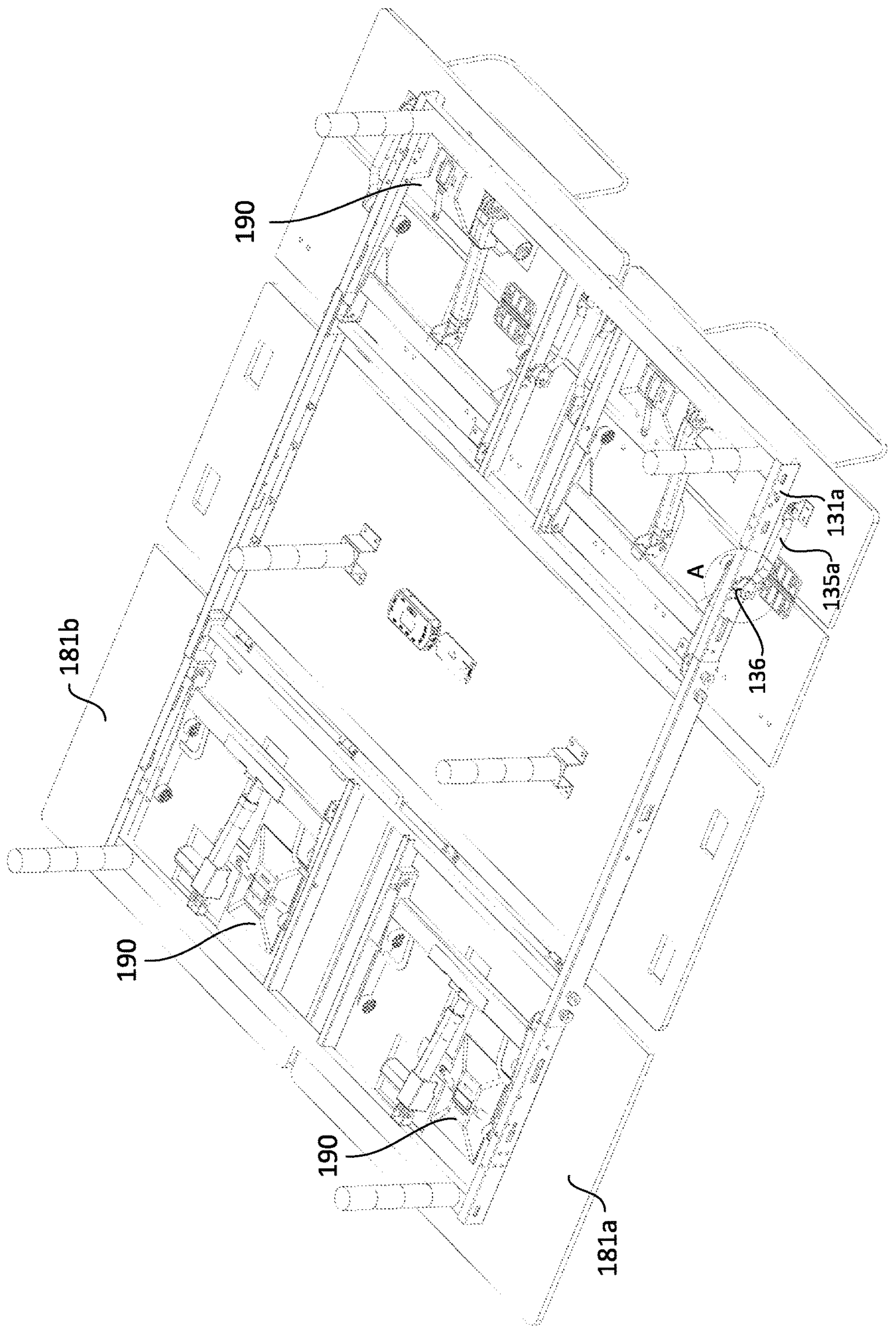
FIG. 9 shows schematically a rear perspective view of the adjustable bed shown in FIG. 8.

Referring to FIGS. 7-9, a portable and adjustable bed 200 is shown according to embodiments of the invention. The portable and adjustable bed 200 is structurally similar to the portable and adjustable bed 100, except that each leg support bar 135*a*/135*b*/135*c*/135*d* is pivotally connected to a respective side/middle rail 131*a*/131*b*/131*c*/131*d* of the second frame 130 by a foot lifting support assembly 136, as shown in FIGS. 7 and 9.

Figure 10A:
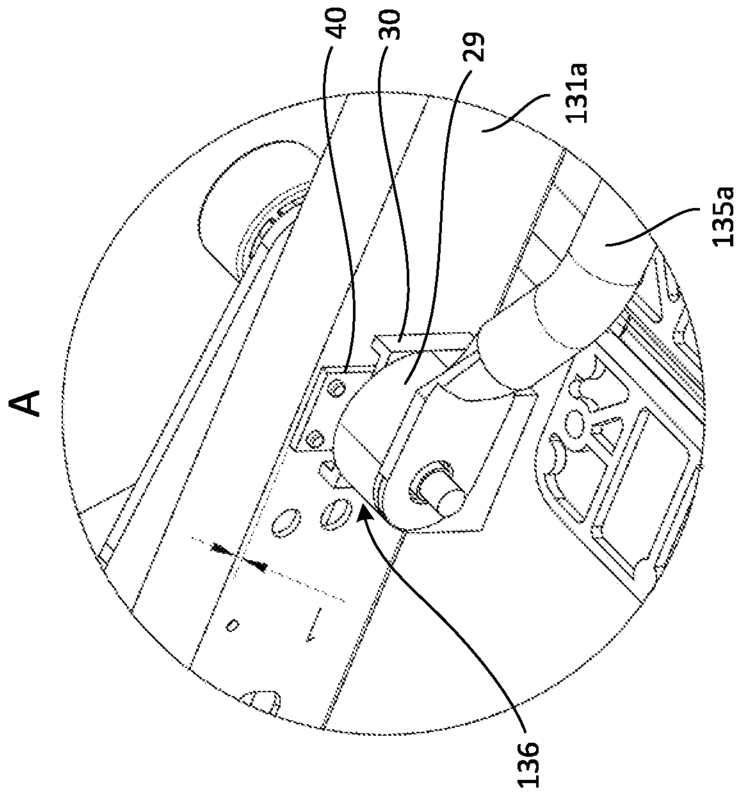
FIGS. 10A-10B show two enlarged view of a foot lifting support assembly (portion A in FIG. 9) according to one embodiment of the invention.
Figure 10B:
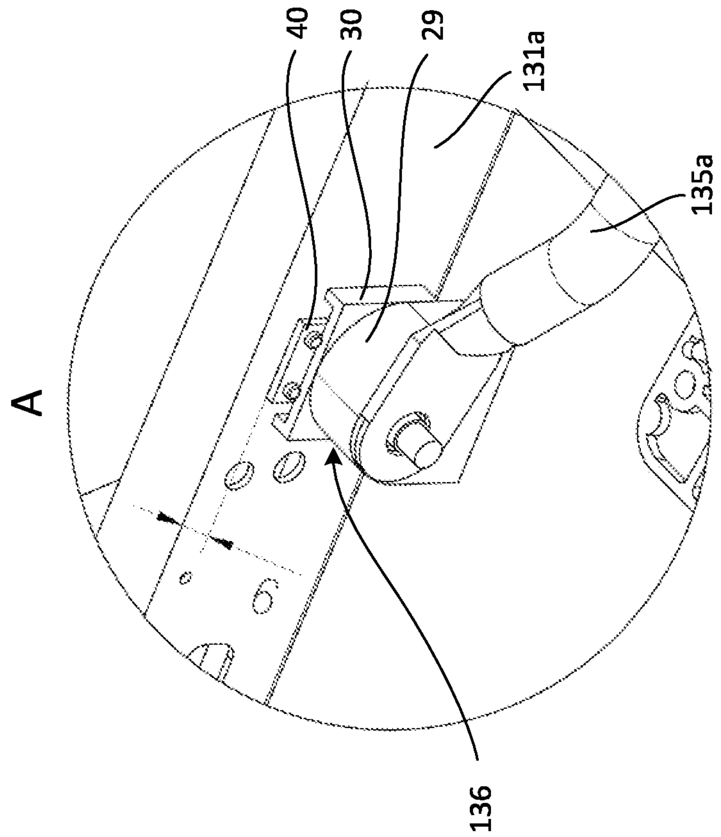

In one embodiment shown in FIGS. 10A-10B, the foot lifting support assembly 136 includes a sliding bracket 29, a sliding bracket groove 30, and a stop pin 40. The foot lifting support assembly 136 is attached onto each of the side rails 131*a* and 131*d* and the middle rails 131*b* and 131*c*/of the second frame 130. Specifically, the sliding bracket groove 30 is rigidly connected to the respective side/middle rail 131*a*/131*b*/131*c*/131*d* of the second frame 130. The sliding bracket 29 has an insert piece on the side of the sliding bracket 29 that is received in the sliding bracket groove 30, the leg support bar 135*a*/135*b*/135*c*/135*d* has one end connected to the sliding bracket 29 and another end fixed to the leg platform 184*a*/184*b*, and the stop pin 40 is coupled to the sliding bracket 29 to operably restrict vertical movements of the sliding bracket 29. That is, the sliding bracket 29 has an insert hole on the side of the sliding bracket 29, and the stop pin 40 is inserted into the insert hole to operably restrict vertical movements of the sliding bracket 29. Under normal circumstances, a distance between the sliding bracket 29 and the respective side/middle rail 131*a*/131*b*/131*c*/131*d* is for example about 1 mm. When the foot lifting portion needs to be lifted open, the sliding bracket 29 is lifted up, for example, by about 9 mm, at which the stop pin 40 is blocked by the sliding bracket groove 30. Preferably, the sliding bracket groove 30 is welded to the respective side/middle rail 131*a*/131*b*/131*c*/131*d* of the second frame 130, and t the leg support bar 135*a*/135*b*/135*c*/135*d* is connected to the sliding bracket 29 by a bolt, but other connecting means can also be utilized.

In addition, the portable and adjustable bed 200 further has a plurality of massage devices 190 for providing massage effects. As shown in FIGS. 7-9, each massage device 190 is mounted onto one of the back platforms 181*a* and 181*b*, and the leg platforms 184*a* and 184*b* through a massage receiving slot 26 formed thereon.

Figure 11B:
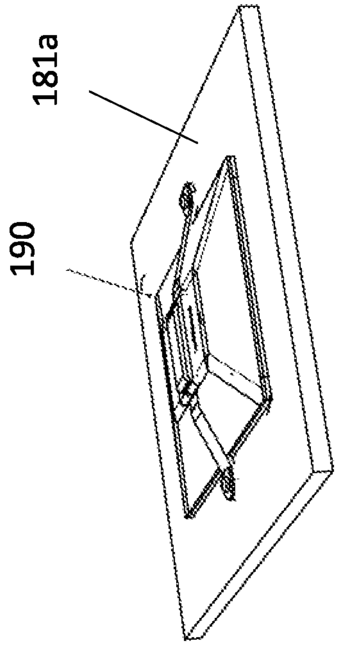
FIGS. 11A-11B show two views of a massage device according to one embodiment of the invention.
Figure 11A:
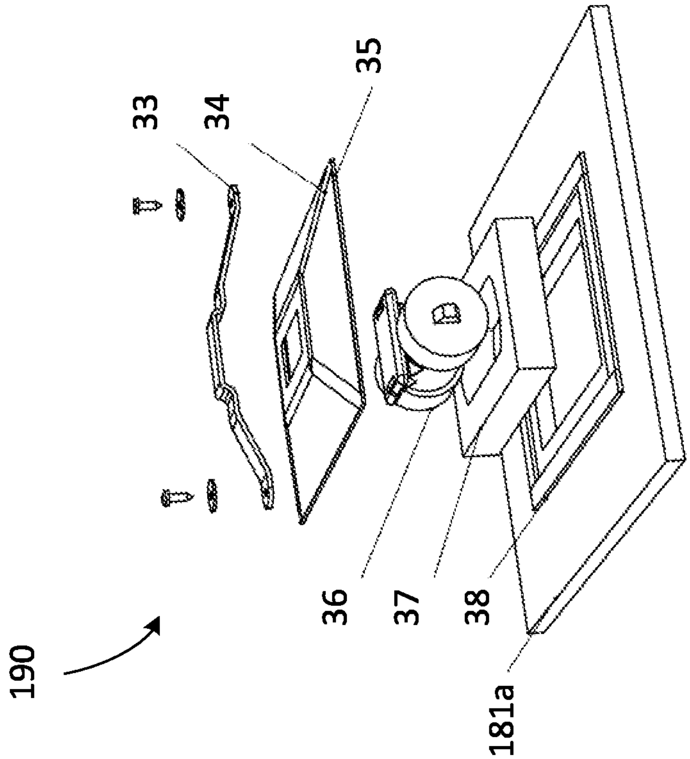

As shown in FIGS. 11A and 11B, the massage assembly 190 includes a massage motor 36, an elastic belt 33, a massage motor cover 34, a velcro loop surface 35, a foam house 37, and a velcro hook surface 38. The velcro loop surface 35 and the massage motor cover 34 are connected. A side of the massage motor 36 passes through an opening of the massage motor cover 34, and the elastic belt 33 passes through the side of the massage motor 36 (the side of the massage motor 36 has a small opening for the elastic belt to pass through) to connect the components as a whole. Further, the velcro hook surface 38 is fixed onto a platform, e.g., a back platform 181*a*, which may be done by a nail or any other connecting means not limited thereto. The foam house 37 is placed inside the massage receiving slot 26 of the back platforms 181*a*, and the massage motor 36 as assembled above is placed inside a hole of the foam house 37 so that the velcro loop surface 35 and the velcro hook surface 38 are fit together. Finally, the massage motor 36 is fastened onto the back platforms 181*a*, e.g., via a pair of screws and a pair of washers. The massage motor 36 can be easily replaced by simply removing the elastic belt 33 from the side of the massage motor 36 and separating the velcro surfaces.

Furthermore, the portable and adjustable bed 200 may also have an aromatherapy system 195 (FIG. 12) attached onto the one or more platforms 181-184 for producing desired fragrance in a surrounding space of the adjustable bed so as to promote health and well-being of a user. the Details of the aromatherapy system 195 in some embodiments are disclosed in U.S. patent application Ser. Nos. 16/990,085 and 17/963,256, which are incorporated herein in their entireties by reference, and will not be repeated herein.

Figure 12:
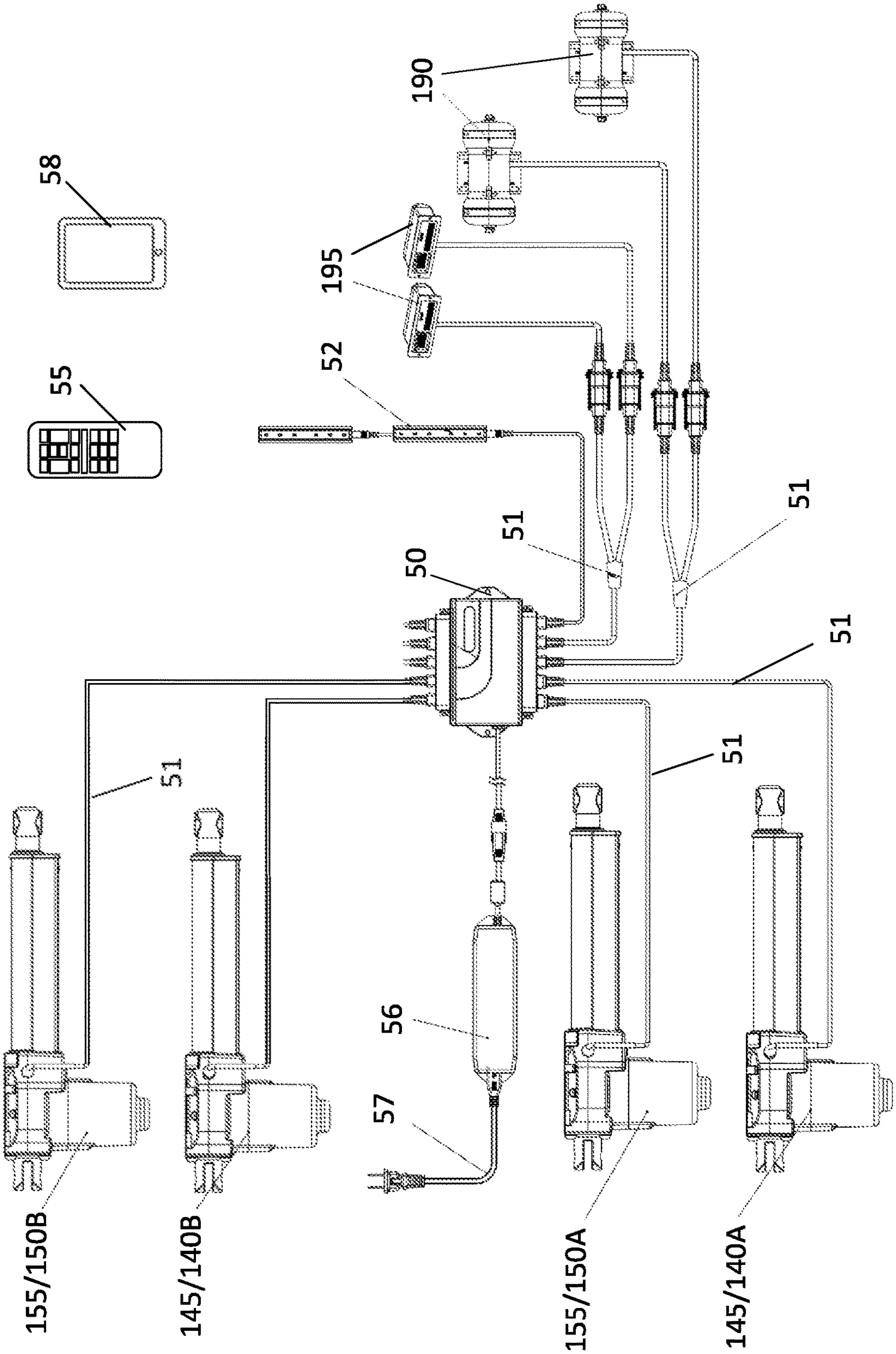
FIG. 12 shows schematically a control system according to one embodiment of the invention.

The adjustable bed further includes a controlling system having a controller 50, which is shown in FIG. 12 according to one embodiment of the invention. The controller 50 is configured to control operations of the back lifting actuators (motors) 145/140A and 145/140B, the leg lifting actuators (motors) 155/150A and 155/150B, the aromatherapy system 195, and the massage assembly 190, respectively, so as to lift individually or cooperatively the head lifting platforms 181*a* and 181*b*, the thigh platforms 183*a* and 183*b*, and the leg platforms 184*a* and 184*b* in desired positions, to produce the fragrance in the surrounding space of the adjustable bed, and to provide the massage effects to the user. In one embodiment shown in FIG. 12, the control system includes a power cord 57, a power supply 56, a control box (controller) 50, a plurality of connecting cables 51, and LED lights 52. The control box 50 is powered by the power supply 56 which is in turn connected to any power source via the power cord 57. The back lifting motors 145/140A and 145/140B and the leg lifting motors 155/150A and 155/150B are connected to the control box 50 via the plurality of connection cables 51. In this way, the user can adjust the bed position via a remote controller 55 or an app installed in a mobile device such as a smart phone 58. Alternatively, LED lights 52 can be employed to indicate the working conditions of the back lifting motors 145/140A and 145/140B and the leg lifting motors 155/150A and 155/150B.

FIG. 12 shows one exemplary embodiment of the controlling system with the controller 50 wiredly connected to the back lifting motors 145/140A and 145/140B and the leg lifting motors 155/150A and 155/150B, the aromatherapy system 195, the massage assembly 190, and/or LED lights 52 through the connecting cables 51. In other embodiments, these connections of the controller 50 connected to t the back lifting motors 145/140A and 145/140B and the leg lifting motors 155/150A and 155/150B, the aromatherapy system 195, the massage assembly 190, and/or LED lights 52 are wireless connections through the Internet, WiFi®, Bluetooth®, cellular network, and/or a mobile network.

According to the embodiments of the invention disclosed above, the adjust bed 100/200 includes two bed sections each of which has a back lifting assembly 140A/140B and a leg lifting assembly 150A/150B, and each of the back lifting assembly 140A/140B and the leg lifting assembly 150A/150B can be individually and independently controlled so that positions/angles of the back portion and the lower limb portion of each bed section can be individually and independently adjusted. When the back lifting assemblies 140A and 104B and the leg lifting assemblies 150A and 150B are in their retraction positions, the back lifting brackets 141/140A and 141/140B and the leg lifting brackets 151/150A and 151/150B are in a horizontal state, such that the platforms 180 are in the flat state, as shown in FIGS. 8-9. When the back lifting assemblies 140A and 104B and the leg lifting assemblies 150A and 150B are in their expansion positions, the back lifting brackets 141/140A and 141/140B and the leg lifting brackets 151/150A and 151/150B are in adjusting states, such that the platforms 180 are lifted in the adjusting state, which is convenient for some daily entertainment activities, as shown in FIGS. 1-2. Each of the back lifting assemblies 140A and 104B and the leg lifting assemblies 150A and 150B can be individually controlled so that the positions/angles of the back platforms 181*a* and 181*b*, the thigh platforms 183*a* and 183*b* and the leg platforms 184*a* and 184*b* can be individually adjusted according to user's preference. It should be noted that the invention can also be extended to a bed system having more than two bed sections with each bed section being individually and independently adjusted.

In addition, the bed has therapeutic functions to promote health and well-being of a user.

Further, the use of the pair of connection bars 160 to detachably connect the first and second frames 120 and 130 makes the installation, transportation, and/or maintenance of the adjustable bed easier, which makes the adjustable bed portable as well.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

What is claimed is:

1. An adjustable bed, comprising:

a frame structure having a first frame, a second frame, and a pair of connection bars detachably connecting the first frame and the second frame to one another;

a plurality of platforms having two or more back platforms disposed on the first frame and two or more lower limb platforms disposed on the second frame;

an adjustable assembly comprising two or more back lifting assemblies coupled with the first frame and two or more leg lifting assemblies coupled with the second frame for individually adjusting each of the two or more back platforms and the two or more lower limb platforms in desired positions; and a plurality of foot lifting support assemblies and a plurality of leg support bars, each leg support bar being pivotally connected to the second frame through one of the plurality of foot lifting support assemblies, wherein each foot lifting support assembly comprises a sliding bracket, a sliding bracket groove, and a stop pin, wherein the sliding bracket groove is rigidly connected to the second frame, the sliding bracket is received in the sliding bracket groove, each leg support bar has one end pivotally connected to the sliding bracket and another end pivotally connected to one of the two or more lower limb platforms, and the stop pin is coupled to the sliding bracket to operably restrict vertical movements of the sliding bracket.

2. An adjustable bed, comprising:

a frame structure having a first frame, a second frame, and a pair of connection bars detachably connecting the first frame and the second frame to one another;

a plurality of platforms having two or more back platforms disposed on the first frame and two or more lower limb platforms disposed on the second frame; and an adjustable assembly comprising two or more back lifting assemblies coupled with the first frame and two or more leg lifting assemblies coupled with the second frame for individually adjusting each of the two or more back platforms and the two or more lower limb platforms in desired positions, wherein each of the first and second frames comprises:

a pair of side rails and at least one middle rail being transversely spaced and longitudinally extended and being parallel to each other, each of the pair of side rails and the at least one middle rail having an upper end portion and an opposite, lower end portion; and an upper rail and a lower rail being longitudinally spaced and transversely extended, two ends of the upper rail being rigidly connected to the upper end portions of the pair of side rails, and two ends of lower rail being rigidly connected to the lower end portions of the pair of side rails, and the upper and lower end portions of the at least one middle rail being rigidly connected to the upper rail and the lower rail, respectively, such that the upper rail, the lower rail, the pair of side rails and the at least one middle rail are in rectangle forms.

3. The adjustable bed of claim 2, wherein each of the pair of connection bars is connected between the lower end portion of a respective rail of the first frame and the upper end portion of a respective rail of the second frame.

4. The adjustable bed of claim 3, wherein the connections between the first frame and the pair of connection bars, and the pair of connection bars and the second frame are bolted connections, screw connections, and/or pin connections.

5. The adjustable bed of claim 4, wherein each of the lower end portions of the pair of side rails of the first frame and the upper end portions of the pair of side rails of the second frame has one or more mounting posts or pins, and wherein two end portions of each of the pair of connection bars has one or more receiving holes in which, as assembled, the one or more mounting posts or pins are received.

6. The adjustable bed of claim 5, wherein each of the pair of connection bars is made of C-shaped steel or alloy.

7. The adjustable bed of claim 2, wherein each of the two or more back lifting assemblies comprises a back lifting bracket pivotally connected to the first frame, and a back lifting actuator pivotally connected between the back lifting bracket and the first frame for operably driving the back lifting bracket to pivotally move in an upward rotation direction or a downward rotation direction relative to the first frame; and wherein each of the two or more leg lifting assemblies comprises a leg lifting bracket pivotally connected to the second frame, and a leg lifting actuator pivotally connected between the leg lifting bracket and the second frame for operably driving the leg lifting bracket to pivotally move in an upward rotation direction or a downward rotation direction relative to the second frame.

8. The adjustable bed of claim 7, wherein the back lifting bracket comprises a middle bar and a pair of swing arms, wherein the pair of swing arms is transversely spaced and rigidly connected to ends of the transversely extending middle bar, and each of the pair of swing arms has a first end portion and an opposite, second end portion, wherein the first end portions of the pair of swing arms are pivotally mounted to a respective side rail and the at least one middle rail of the first frame; and wherein the back lifting actuator comprises a motor member, an outer tube extending from the motor member, an activation rod received in the outer tube, engaged with the motor member and configured to be telescopically movable relative to the outer tube according to a direction of motor rotation, wherein the motor member is pivotally connected to the upper rail of the first frame, and the activation rod has a distal end portion pivotally connected to the middle bar of the back lifting bracket, or wherein the motor member is pivotally connected to the middle bar of the back lifting bracket, and the activation rod has a distal end portion pivotally connected to the upper rail of the first frame.

9. The adjustable bed of claim 8, wherein the swing arms are in an arc-shaped design.

10. The adjustable bed of claim 8, wherein the second end portion of the swing arms is equipped with a back lifting wheel or roller.

11. The adjustable bed of claim 7, wherein the leg lifting bracket comprises a middle bar and a pair of swing arms, wherein the pair of swing arms is transversely spaced and rigidly connected to ends of the transversely extending middle bar, and each of the pair of swing arms has a first end portion and an opposite, second end portion, wherein the first end portions of the pair of swing arms are pivotally mounted to a respective side rail and the at least one middle rail of the second frame; and wherein the leg lifting actuator comprises a motor member, an outer tube extending from the motor member, an activation rod received in the outer tube, engaged with the motor member and configured to be telescopically movable relative to the outer tube according to a direction of motor rotation, wherein the motor member is pivotally connected to the lower rail of the second frame, and the activation rod has a distal end portion pivotally connected to the middle bar of the leg lifting bracket, or wherein the motor member is pivotally connected to the middle bar of the leg lifting bracket, and the activation rod has a distal end portion pivotally connected to the lower rail of the second frame.

12. The adjustable bed of claim 11, wherein the second end portion of the swing arms is equipped with a leg lifting wheel or roller.

13. The adjustable bed of claim 2, wherein the two or more back platforms are hinged to the lower rail of the first frame.

14. The adjustable bed of claim 2, wherein each of the two or more lower limb platforms has a thigh platform having its bottom edge hinged to the upper rail of the second frame; and a leg platform hinged to the top edge of the thigh platform and supported by the pair of foot lifting support bars pivotally connected to the second frame.

15. The adjustable bed of claim 2, further comprising at least one massage assembly detachably attached onto at least one of the two or more back platforms and the two or more lower limb platforms for providing massage effects.

16. The adjustable bed of claim 1, wherein at least one massage assembly comprises a massage motor, an elastic belt, a motor cover, a foam house, a velcro loop surface, and a velcro hook surface;

wherein the motor cover has an opening, a side of the massage motor passes through the opening of the motor cover, the elastic belt passes through the side of the massage motor, one of the velcro loop surface and the velcro hook surface is fixed onto the motor cover and the other of the velcro loop surface and the velcro hook surface is fixed onto a decking on one of the plurality of platforms, the foam house is placed inside a hole of the decking, the massage motor is placed inside a hole of the foam house so that the velcro loop surface and the velcro hook surface are fit together, and the massage motor is fastened onto the decking.

17. The adjustable bed of claim 2, further comprising a plurality of bed post assemblies detachably mounted onto the frame structure.

18. The adjustable bed of claim 17, wherein each bed post assembly comprises two or more post members detachably connected to one another, each post member having:

a cylindrical body portion having an outer surface defining a top edge and an opposite bottom edge, a top recessed surface recessed from the top edge, and a bottom recessed surface recessed from the bottom edge;

a connecting bolt protruded from the top recessed surface and extended beyond the top edge of the cylindrical body portion; and a receiving hole defined in the bottom recessed surface of the cylindrical body portion, wherein as assembled, the two or more post members are connected to one another by placing the connecting bolt of one of the two or more post members into the receiving hole of another of the two or more post members, and the post assembly is connected to the frame structure through the connecting bolt of a top post member of the two or more members.

19. An adjustable bed, comprising:

a frame structure having a first frame, a second frame, and a pair of connection bars detachably connecting the first frame and the second frame to one another;

a plurality of platforms having two or more back platforms disposed on the first frame and two or more lower limb platforms disposed on the second frame; and an adjustable assembly comprising two or more back lifting assemblies coupled with the first frame and two or more leg lifting assemblies coupled with the second frame for individually adjusting each of the two or more back platforms and the two or more lower limb platforms in desired positions; and a plurality of bed post assemblies detachably mounted onto the frame structure;

wherein each bed post assembly comprises at least a first post member detachably connected to the frame structure and a second post member detachably connected to the first post member, wherein the first post member has a cylindrical body portion with a top end having a top surface and a top recessed surface recessed from the top surface and an opposite bottom end having a bottom surface and a bottom recessed surface recessed from the bottom surface, a connecting bolt protruded from the top recessed surface and extended beyond the top surface, and a receiving hole defined in the bottom recessed surface; and wherein the second post member has a body portion with a top end having a top surface and a top recessed surface recessed from the top surface and an opposite bottom end having a bottom surface, and a connecting bolt protruded from the top recessed surface and extended beyond the top surface, wherein the top end has a side-to-side width greater than a side-to-side width of the bottom end, and wherein the side-to-side width of the top end of the second post member is substantially equal to a side-to-side width of the bottom end of the first post member, wherein as assembled, the first post member is connected to the frame structure through the connecting bolt of the first post member, and the connecting bolt of the second post member is received in the receiving hole of the first post member, such that the top surface of the first post member abuts against a bottom surface of the frame structure, and the top surface of the second post member abuts against the bottom surface of the first post member.

* * * * *